(12) United States Patent
Shinohara et al.

(10) Patent No.: US 9,473,617 B2
(45) Date of Patent: Oct. 18, 2016

(54) TERMINAL APPARATUS, CONTROL SYSTEM, AND CONTROL METHOD FOR CONTROLLING COLLABORATION AMONG A PLURALITY OF DEVICES

(75) Inventors: Sumito Shinohara, Tokyo (JP);
Takehiro Aibara, Tokyo (JP); Hitoshi Amagai, Tokyo (JP); Naotaka Uehara, Tokyo (JP); Takayuki Kogane, Tokyo (JP); Tetsuya Handa, Tokyo (JP); Masato Nunokawa, Tokyo (JP); Kimiyasu Mizuno, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1098 days.

(21) Appl. No.: 13/075,342

(22) Filed: Mar. 30, 2011

(65) Prior Publication Data
US 2011/0246903 A1 Oct. 6, 2011

(30) Foreign Application Priority Data

Mar. 30, 2010 (JP) ................................. 2010-077629

(51) Int. Cl.
| | |
|---|---|
| *G06F 15/16* | (2006.01) |
| *H04M 1/725* | (2006.01) |
| *G08C 17/00* | (2006.01) |
| *H04L 12/64* | (2006.01) |
| *H04L 29/08* | (2006.01) |
| *H04L 29/06* | (2006.01) |
| *H04W 4/00* | (2009.01) |

(52) U.S. Cl.
CPC .......... *H04M 1/72533* (2013.01); *G08C 17/00* (2013.01); *H04L 12/6418* (2013.01);
(Continued)

(58) Field of Classification Search
None
See application file for complete search history.

(56) References Cited

U.S. PATENT DOCUMENTS 7,673,079 B2 * 3/2010 Hayashi et al. ................. 710/16
8,451,990 B2 * 5/2013 Albert ................... H04L 12/589
379/355.04

(Continued)

FOREIGN PATENT DOCUMENTS

| JP | 2002-218563 A | 8/2002 |
|---|---|---|
| JP | 2003-047074 A | 2/2003 |

(Continued)

OTHER PUBLICATIONS

Japanese Office Action dated Jun. 25, 2013 (and English translation thereof) in counterpart Japanese Application No. 2010-077629.

(Continued)

*Primary Examiner* — Joseph E Avellino
*Assistant Examiner* — Phyllis A Book
(74) *Attorney, Agent, or Firm* — Holtz, Holtz & Volek PC

(57) ABSTRACT

An apparatus, system, or method for causing a controlled device and a controlling terminal to operate in collaboration with each other, wherein a server apparatus stores in advance a plurality of sets of collaboration information which causes the controlled device and the controlling terminal to operate in collaboration with each other. The plurality of sets of collaboration information is respectively stored in association with a plurality of controlled apparatuses different from one another in type. When the controlling terminal requests the server apparatus to send the collaboration information designating the type of the controlled device, the server apparatus sends to the controlling terminal the collaboration information corresponding to the type of the controlled device. The controlled device and the controlling terminal operate in collaboration with each other using the collaboration information.

18 Claims, 6 Drawing Sheets

(52) U.S. Cl.
CPC ............... *H04L67/34* (2013.01); *H04L 69/24* (2013.01); *H04W 4/005* (2013.01); *G08C 2201/20* (2013.01); *G08C 2201/41* (2013.01); *H04L 67/125* (2013.01)

(56) References Cited

U.S. PATENT DOCUMENTS

| | | | |
|---|---|---|---|
| 8,745,133 B2 * | 6/2014 | Martinez | G06F 17/30067 709/204 |
| 8,756,347 B2 * | 6/2014 | Tsuru et al. | 710/14 |
| 2003/0013485 A1 | 1/2003 | Jung | |
| 2003/0136827 A1 | 7/2003 | Kaneko et al. | |
| 2003/0177187 A1 * | 9/2003 | Levine | A63F 13/10 709/205 |
| 2004/0205131 A1 * | 10/2004 | Saruhashi | H04N 7/147 709/205 |
| 2004/0259537 A1 | 12/2004 | Ackley | |
| 2005/0009470 A1 | 1/2005 | Kim | |
| 2005/0128194 A1 | 6/2005 | Wada | |
| 2005/0198204 A1 | 9/2005 | Takahashi | |
| 2007/0178891 A1 | 8/2007 | Louch et al. | |
| 2007/0180025 A1 * | 8/2007 | Kobayakawa | G06Q 90/00 709/204 |
| 2007/0244871 A1 * | 10/2007 | Phibbs | G06F 17/30392 |
| 2007/0271338 A1 * | 11/2007 | Anschutz | G06Q 10/10 709/204 |
| 2008/0167002 A1 | 7/2008 | Kim et al. | |
| 2008/0220761 A1 | 9/2008 | Jang | |
| 2008/0228876 A1 * | 9/2008 | Johnson | G06Q 30/0601 709/204 |
| 2008/0231761 A1 | 9/2008 | Nishikata et al. | |
| 2009/0031250 A1 * | 1/2009 | Boudreau | H04W 4/00 715/810 |
| 2009/0063368 A1 * | 3/2009 | Morishita | G06Q 30/04 705/400 |
| 2009/0150794 A1 | 6/2009 | Sano | |
| 2009/0214014 A1 * | 8/2009 | Cadiz | H04M 1/2473 379/142.15 |
| 2009/0252134 A1 * | 10/2009 | Schlicht | H04L 1/0015 370/338 |
| 2010/0085275 A1 | 4/2010 | Inami et al. | |
| 2010/0121921 A1 * | 5/2010 | Dunton | G06F 15/16 709/205 |
| 2010/0149332 A1 | 6/2010 | Wang | |
| 2010/0174782 A1 * | 7/2010 | Rose | G06Q 20/0855 709/204 |
| 2014/0088775 A1 | 3/2014 | Sugiyama et al. | |

FOREIGN PATENT DOCUMENTS

| | | | | |
|---|---|---|---|---|
| JP | 2003-047796 A | | 2/2003 | |
| JP | 2003047074 | * | 2/2003 | ............... H04Q 9/00 |
| JP | 2003047074 A | * | 2/2003 | |
| JP | 2003047074 A2 | * | 2/2003 | ............... H04Q 9/00 |
| JP | 2003-125467 A | | 4/2003 | |
| JP | 2003-205195 A | | 7/2003 | |
| JP | 2004-254070 A | | 9/2004 | |
| JP | 2006-352286 A | | 12/2006 | |
| JP | 2007-515698 A | | 6/2007 | |

OTHER PUBLICATIONS

Japanese Office Action dated Jun. 12, 2012 (and English translation thereof) in counterpart Japanese Application No. 2010-077629.

Japanese Office Action dated Jan. 24, 2012 (and English translation thereof) in counterpart Japanese Application No. 2010-077629.

* cited by examiner

TERMINAL APPARATUS, CONTROL SYSTEM, AND CONTROL METHOD FOR CONTROLLING COLLABORATION AMONG A PLURALITY OF DEVICES

This application is based on and claims the benefit of priority from Japanese Patent Application No. 2010-077629 filed on Mar. 30, 2010, the content of which is incorporated herein by reference.

BACKGROUND OF THE INVENTION

1. Field of the Invention

The present invention relates to a terminal apparatus, control system, and control method for controlling collaboration among a plurality of devices, and more particularly to a technology that enables a controlled device and a controlling terminal to operate with each other, thereby realizing a new function.

2. Related Art

Recently, mobile phone ownership is rapidly increasing with the development of communication technology, and the number of functions incorporated in a mobile phone is increasing as well.

Such a mobile phone provides availability at any time and at any location due to the high portability thereof. Conventionally, there is known a technology which, making use of such a feature, enables a user outside the home to remotely control home devices by way of a mobile phone (see Japanese Patent Application Publication No. 2007-515698, Japanese Patent Application Publication No. 2002-218563, for example).

Also, there are such mobile phones that provide a function of direct accessibility to a server on a network such as the Internet without any intervening device such as a personal computer. Conventionally, there is known a technology which, making use of such a function, enables a mobile phone to download a program from a server to realize a new function.

Furthermore, there are such mobile phones that have function of a peer-to-peer communication with other devices. Conventionally, there is known a technology which, making use of such a function, enables a mobile phone to acquire authentication information to communicate peer-to-peer with other device and thereby establish communication configuration (see Japanese Patent Application Publication No. 2006-352286, for example).

Thus, recent mobile phones are becoming more user friendly, as well as being able to communicate with other devices, and to remotely control other devices.

SUMMARY OF THE INVENTION

In accordance with a first aspect of the present invention, there is provided a control system, including a controlled apparatus, a controlling terminal, and a server apparatus, which are connected to communicate with one another, in which the server apparatus includes: a storing unit that stores a plurality of sets of collaboration information each of which causes a controlled apparatus and a controlling terminal to operate in collaboration with each other, the plurality of sets of collaboration information being respectively stored in association with a plurality of controlled apparatuses different from one another in type; and a first communication control unit that, when a transmission request for collaboration information designated by a type of a controlled apparatus is sent by a controlling terminal, selects collaboration information corresponding to the type of the controlled apparatus, from among a plurality of sets of the collaboration information stored in the storing unit, and sends the collaboration information to the controlling terminal, the controlling terminal includes: a second communication control unit that sends a transmission requests to the server apparatus to send collaboration information designated by a type of a controlled apparatus, and receives collaboration information sent from the server apparatus, in response to the transmission request; a third communication control unit that sends the collaboration information thus received to the controlled apparatus designated by the type; and a first collaboration control unit that controls the controlled apparatus based on the collaboration information thus received, and the controlled apparatus includes: a fourth communication control unit that receives collaboration information from the controlling terminal; and a second collaboration control unit that operates in accordance with a new function based on the collaboration information thus received.

In accordance with another aspect of the present invention, there is provided a controlling terminal which operates in collaboration with a controlled apparatus, including: a first communication control unit that controls a communication via a wide area network with a server apparatus that stores a plurality of sets of collaboration information each of which causes a controlled apparatus and a controlling terminal to operate in collaboration with each other, the plurality of sets of collaboration information being respectively stored in association with a plurality of controlled apparatuses different from one another in type; a second communication control unit that controls a communication by way of a personal communication means with a plurality of controlled apparatuses different from one another in types; an acquisition control unit that sends a transmission request for collaboration information designated by a type of a controlled apparatus which is an object of control to be controlled for operating in collaboration with the controlling terminal itself by the first communication control unit to the server apparatus; and a collaboration control unit that sends the collaboration information acquired by the acquisition control unit to a controlled apparatus to be controlled for operating in collaboration with the controlling terminal itself and controls the controlled apparatus to be controlled for operating, based on the collaboration information thus sent.

In accordance with another aspect of the present invention, there is provided an image display apparatus operating in collaboration with a controlling terminal, including: a display unit that displays an image; a communication control unit that sends a model information indicative of a type of the image display apparatus itself to the controlling terminal in response to a request from the controlling terminal; an acquisition control unit that acquires a control program sent from the controlling terminal, in response to the model information thus sent; a collaboration control unit that executes a control program acquired by the acquisition control unit, in such a manner that, as an extension function related to an image display, the collaboration control unit interprets a command sent from the controlling terminal, related to the extension function, and performs image processing and image display selectively in response to the result of the interpretation.

In accordance with another aspect of the present invention, there is provided a control method of a control system, including a controlled apparatus, a controlling terminal, and a server apparatus, which are connected to communicate with one another, the method including: a step of sending a transmission request from the controlling terminal to the server apparatus, for collaboration information designated by a type of the controlled apparatus; a step of selecting collaboration information corresponding to the type of the controlled apparatus, by the server apparatus, upon receiving the transmission request, from among a plurality of sets of the collaboration information stored therein, the plurality of sets of collaboration information each of which causes a controlled apparatus and a controlling terminal to operate in collaboration with each other, the plurality of sets of collaboration information being respectively stored in association with a plurality of controlled apparatuses different from one another in type, and sending the collaboration information to the controlling terminal; a step performed by the controlling terminal, of receiving collaboration information sent from the server apparatus in response to the transmission request, and sending the collaboration information thus received to the controlled apparatus designated by the type, a step performed by the controlling terminal, of sending a control command based on the received collaboration information to the controlled apparatus, and a step performed by the controlled apparatus, of executing a control command sent from the controlling terminal based on the received collaboration information.

DETAILED DESCRIPTION OF THE INVENTION

The following describes one embodiment of the present invention with reference to the drawings.

Figure 1:
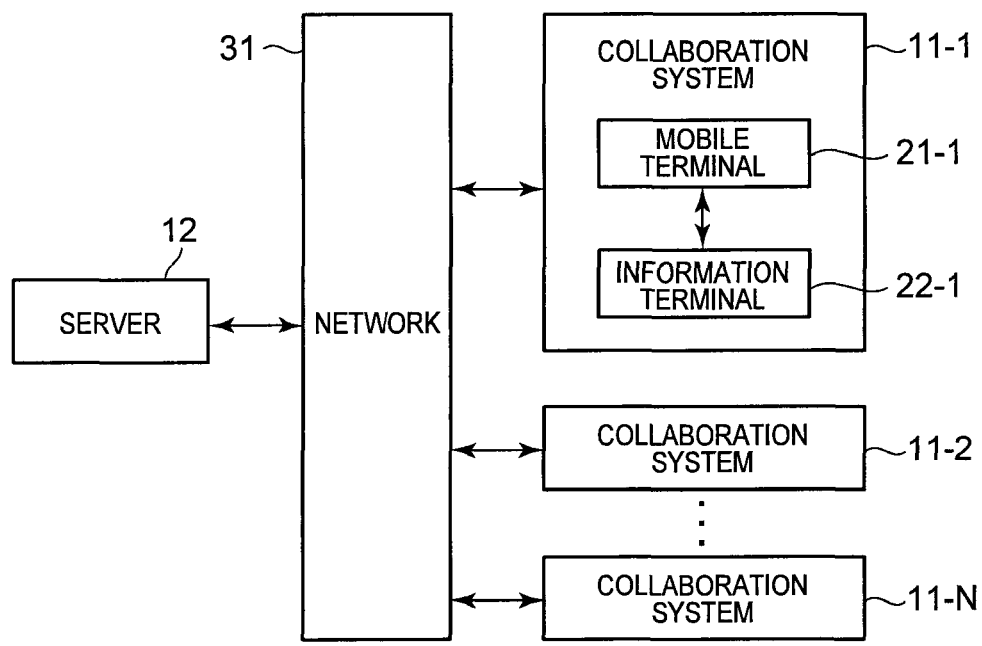
FIG. 1 is a block diagram showing a configuration of an information processing system according to one embodiment of the present invention.

FIG. 1 is a block diagram showing a configuration of an information processing system according to one embodiment of the present invention.

The information processing system shown in FIG. 1 is provided with collaboration systems 11-1 to 11-N (N is an arbitrary integer larger than zero) and a server 12. The collaboration systems 11-1 to 11-N and the server 12 are connected with one another via a predetermined network 31 such as the Internet.

The collaboration system 11-1 includes a mobile terminal 21-1 and an information terminal 22-1.

Although it is illustrated in FIG. 1 as if only the collaboration system 11-1 includes the mobile terminal 21-1 and the information terminal 22-1, it is only an example for ease of description.

That is, if K is defined as an arbitrary integer between 1 and N, though any collaboration information set for K other than K=1 is not illustrated in FIG. 1, it is assumed that the collaboration system 11-K includes a mobile terminal 21-K and an information terminal 22-K.

In the following, the collaboration systems 11-1 to 11-N are inclusively referred to as "collaboration system 11" unless distinction of individual collaboration systems is necessary. In this case, the mobile terminals 21-1 to 21-N are inclusively referred to as "mobile terminal 21", and the information terminals 22-1 to 22-N are inclusively referred to as "information terminal 22".

It is assumed in the present embodiment that, for example, the mobile terminal 21 is a terminal which a user is accustomed to using due to high portability thereof, and configured by a mobile phone.

On the other hand, it is assumed in the present embodiment that the information terminal 22 is a terminal which a user is unfamiliar with, and is configured by, for example, a digital photo frame.

In the present embodiment, the mobile terminal 21 and the information terminal 22 operate in collaboration with each other to install a new function into the information terminal 22, and the information terminal 22 is caused to implement the new function based on remote control from the mobile terminal 21. Hereinafter, such processing for the mobile terminal 21 and the information terminal 22 to operate in collaboration with each other is referred to as "collaboration processing".

As a result thereof, the user can easily (without reading an operating manual carefully or the like) remotely control the information terminal 22, which the user is not familiar with, by using the mobile terminal 21, which the user is accustomed to the use of. Here, "remote control" refers to controlling the information terminal 22 by way of another device (the mobile terminal 21, in this case) and not by way of a native controller (the operation unit 65 of FIG. 2, which is described later). Therefore, what is referred to as remote control can include not only a case in which the operation is controlled from outside the home but also a case in which a user controls the information terminal 22 in sight using the mobile terminal 21 as if using an ordinary remote controller.

Here, what are requisite for implementation of the collaboration processing are a first communication within the collaboration system to remotely control the information terminal 22 by way of the mobile terminal 21 and a second communication between the collaboration system and the external server 12 via the network 31 to acquire a new function provided from the server 12.

The first communication is a communication between the mobile terminal 21 and the information terminal 22, i.e., between devices within a relatively short distance, using a personal communication method that connects specific devices such as individually-owned devices. Therefore, such a communication is hereinafter referred to as "short distance communication". On the other hand, the second communication is a communication between the server 12 and the mobile terminal 21 or the information terminal 22, i.e., between devices over a relatively long distance, using a public network that connects an unspecified number of devices. Therefore, such a communication is hereinafter referred to as "long distance communication".

The method of the short distance communication is not limited, and, as the method thereof, a wireless communication method can be employed that directly transfers a signal from a transmitter to a receiver. More specifically, in the present embodiment, a short distance wireless communication (hereinafter, referred to as "infrared communication") via infrared light waves according to IrDA (Infrared Data Association) standard is employed.

Also, the method of the long distance communication is not limited, and, as the method thereof, a wireless communication method can be employed that wirelessly communicates from the own device to a relay device such as an access point that connects with the network 31 and communicates by wire from the relay device to the network 31. More specifically, in the present embodiment, a wireless LAN (Local Area Network) communication according to IEEE802.11 standard stipulated by IEEE (Institute of Electrical and Electronics Engineers) is employed.

In this way, in the present embodiment, the collaboration processing is implemented by combining the short distance communication and the long distance communication.

Figure 2:
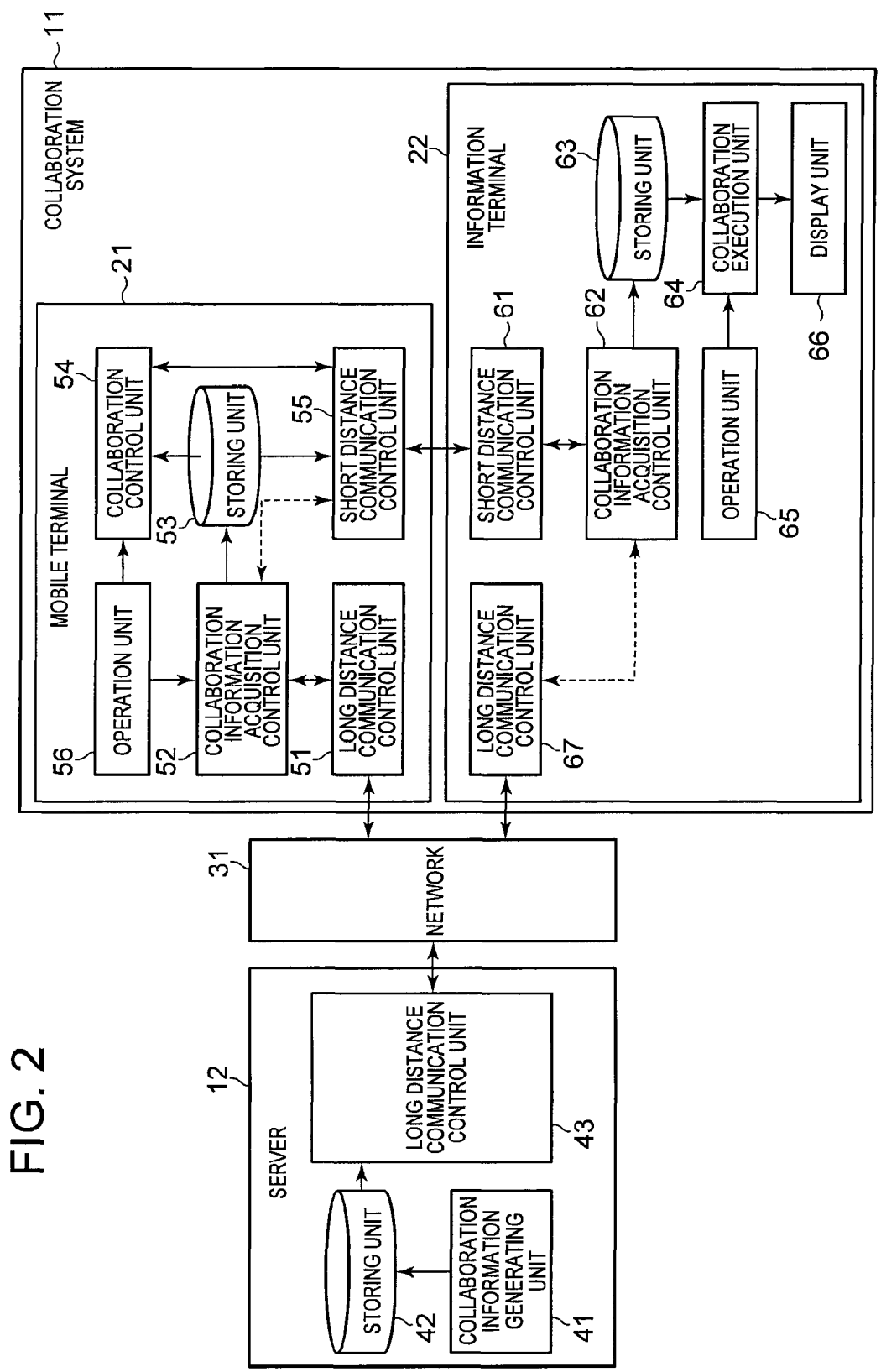
FIG. 2 is a functional block diagram showing a functional configuration of the information processing system of FIG. 1 to carry out collaboration processing.

FIG. 2 is a functional block diagram showing a functional configuration of the information processing system to implement the collaboration processing.

[Functional Configuration of the Server 12]

First, the functional configuration of the server 12 from among the constituent elements of the information processing system will be described.

The server 12 includes a collaboration information generating unit 41, a storing unit 42, and a long distance communication control unit 43.

The collaboration information generating unit 41 generates collaboration information and stores it in the storing unit 42.

Here, the collaboration information is intended to mean such information that enables two devices (the mobile terminal 21 and the information terminal 22, in the present embodiment) to operate in collaboration with each other and one of the devices (the information terminal 22, in the present embodiment) to implement a new function.

Incidentally, there is a case in which a plurality of pieces of collaboration information are used as a set so as to implement a new function. Hereinafter, the set of the plurality of pieces of collaboration information used in such a case is referred to as "collaboration information set".

The collaboration information set includes information mainly used by the mobile terminal 21. Hereinafter, such information is referred to as "mobile terminal oriented information". Also, the collaboration information set includes information mainly used by the information terminal 22. Hereinafter, such information is referred to as "information terminal oriented information".

As used in the example of FIGS. 3 and 4, which will be described later, one example of the collaboration information set is a set of constituent elements of a predetermined application code, i.e., a control program executed in the mobile terminal 21, a control program executed in the information terminal 22, and a command set used in the application code.

Here, the control program executed in the mobile terminal 21 (hereinafter, referred to as "mobile terminal oriented control program") is one example of the mobile terminal oriented information.

On the other hand, the control program executed in the information terminal 22 (hereinafter, referred to as "information terminal oriented control program") is one example of the information terminal oriented information.

Furthermore, various commands in the command set are issued from the mobile terminal 21 and sent to the information terminal 22 via the short distance communication. That is, the information terminal 22 carries out various types of processing according to commands issued from the mobile terminal 21. Therefore, the command set is one example of such information that belongs to both of the mobile terminal oriented information and the information terminal oriented information.

Furthermore, as used in the example of FIG. 5, which will be described later, one example of collaboration information is such information that allows transmission of image data when the server 12 sends and provides the image data to the information terminal 22, more specifically, the ID (IDentification) and password in the example of FIG. 5, which will be described later. Alternatively, regarding the ID and the password as distinct pieces of collaboration information, the set of the ID and the password is one example of the collaboration information set.

In the following, descriptions will be given assuming that the collaboration information set is generated by the collaboration information generating unit 41.

The storing unit 42 stores the collaboration information set generated by the collaboration information generating unit 41.

Here, it should be noted that, even though the new function to be implemented is the same, the type of collaboration information set is different depending upon the model of the mobile terminal 21 or the information terminal 22. This means that the storing unit 42 stores a plurality of collaboration information sets to implement a predetermined new function separately for respective combinations of models of the mobile terminal 21 and models of the information terminal 22.

More specifically, for example, in the present embodiment, it is assumed that the mobile terminals 21-1 to 21-N are different in model from one another, and the information terminals 22-1 to 22-N are different in model from one another. In this case, the storing unit 42 stores N different collaboration information sets such as the collaboration information sets 71-1 to 71-N as shown in FIG. 3, which will be described later, to implement a predetermined new function separately for respective collaboration systems 11-1 to 11-N.

The long distance communication control unit 43 controls a long distance communication with the collaboration system 11 via the network 31. For example, when a request for acquisition of a collaboration information set is sent from the collaboration system 11, the server 12 receives the request via the network 31, reads a collaboration information set associated with the request from the storing unit 42, and sends the collaboration information set to the collaboration system 11 via the network 31.

In the above, a description has been given of the functional configuration of the server 12 from among the constituent elements of the information processing system. In the following, a description will be given of the functional configuration of the collaboration system 11 from among the constituent elements of the information processing system. More specifically, each of the functional configurations of the mobile terminal 21 and the information terminal 22 constituting the collaboration system 11 will be described individually in this order.

[Functional Configuration of the Mobile Terminal 21]

The mobile terminal 21 is provided with a long distance communication control unit 51, a collaboration information acquisition control unit 52, a storing unit 53, a collaboration control unit 54, a short distance communication control unit 55, and an operation unit 56.

The long distance communication control unit 51 controls the long distance communication with the server 12 via the network 31.

For example, the long distance communication control unit 51 sends to the server 12 via the network 31 a request for acquisition of at least a part of a collaboration information set based on the control of the collaboration information acquisition control unit 52. When at least a part of the collaboration information set is sent from the server 12, which has received the request for acquisition, the long distance communication control unit 51 receives the at least a part of the collaboration information set and provides it to the collaboration information acquisition control unit 52.

The collaboration information acquisition control unit 52 carries out a control of acquiring the at least a part of the collaboration information set from the server 12 via the long distance communication control unit 51, and storing it in the storing unit 53. As shown by the dot-line arrow in FIG. 2, the collaboration information acquisition control unit 52 can acquire at least a part of the collaboration information set from the information terminal 22 via the short distance communication control unit 55, and stores it in the storing unit 53, if necessary.

The storing unit 53 stores therein the at least a part of the collaboration information set acquired by the collaboration information acquisition control unit 52.

The collaboration control unit 54 remotely controls the operation on the part of the information terminal 22 while carrying out the short distance communication with the information terminal 22 via the short distance communication control unit 55, as appropriate, based on the mobile terminal oriented information from among the collaboration information sets stored in the storing unit 53. By way of such remote control, a new function associated with the collaboration information set is installed in the information terminal 22, and it becomes possible for the information terminal 22 to implement the new function.

The short distance communication control unit 55 controls the short distance communication with the information terminal 22.

For example, in a case in which the storing unit 53 stores not only the mobile terminal oriented information but also the information terminal oriented information, the short distance communication control unit 55 reads the information terminal oriented information from the storing unit 53, and sends it to the information terminal 22.

As shown by the dot-line arrow in FIG. 2, the short distance communication control unit 55 can receive the mobile terminal oriented information from the information terminal 22 by carrying out the short distance communication with the information terminal 22, and stores it in the storing unit 53 as needed.

The operation unit 56, which is configured by various keys and the like, accepts user's instruction operations on the mobile terminal 21, and informs operation contents thereof to the collaboration information acquisition control unit 52 or the collaboration control unit 54.

Upon receiving this information, the collaboration information acquisition control unit 52 or the collaboration control unit 54 interprets the operation contents, recognizes user's instruction, and carries out at least a part of the control described above according to the recognized instruction.

In the above, a description has been given of the functional configuration of the mobile terminal 21 from among the constituent elements of the collaboration system. In the following, a description will be given of the functional configuration of the information terminal 22 from among the constituent elements of the collaboration system.

[Functional Configuration of the Information Terminal 22]

The information terminal 22 is provided with a short distance communication control unit 61, a collaboration information acquisition control unit 62, a storing unit 63, a collaboration execution unit 64, an operation unit 65, a display unit 66, and a long distance communication control unit 67.

The short distance communication control unit 61 controls the short distance communication with the mobile terminal 21.

For example, as described above, when the information terminal oriented information from among the collaboration information set is sent from the mobile terminal 21, the short distance communication control unit 61 receives the information terminal oriented information and provides to the collaboration information acquisition control unit 62.

In a case in which the information terminal 22 includes the long distance communication control unit 67, as shown by the dot-line arrow in FIG. 2, the collaboration information acquisition control unit 62 can acquire the mobile terminal oriented information from among the collaboration information set. In such a case, the short distance communication control unit 61 sends the mobile terminal oriented information to the mobile terminal 21.

The collaboration information acquisition control unit 62 carries out control of acquiring the information terminal oriented information from among the collaboration information set from the mobile terminal 21 via the short distance communication control unit 61 and storing it in the storing unit 63.

In a case in which the information terminal 22 includes the long distance communication control unit 67, as shown by the dot-line arrow in FIG. 2, the collaboration information acquisition control unit 62 can acquire, if necessary, at least a part of the collaboration information set from the server 12 via the long distance communication control unit 67. When the at least a part of the collaboration information set thus acquired includes the information terminal oriented information, the collaboration information acquisition control unit 62 stores the information terminal oriented information in the storing unit 63. On the other hand, when the at least a part of the collaboration information set thus acquired includes the mobile terminal oriented information, the collaboration information acquisition control unit 62 sends the mobile terminal oriented information to the mobile terminal 21 via the short distance communication control unit 61.

The storing unit 63 stores therein information terminal oriented information from among the collaboration information set acquired by the collaboration information acquisition control unit 62.

The collaboration execution unit 64 carries out the collaboration processing on the part of the information terminal 22 based on the information terminal oriented information stored in the storing unit 63. In this way, a new function associated with the collaboration information set is implemented on the part of the information terminal 22.

The operation unit 65, which is configured by various keys and the like, accepts user's instruction operations on the information terminal 22, and informs operation contents thereof to the collaboration execution unit 64. Upon receiving this information, the collaboration execution unit 64 interprets the operation contents, recognizes user's instruction, and carries out at least a part of the collaboration processing on the part of the information terminal 22 according to the instruction.

However, as described later with reference to FIGS. 3 and 4, there is a case in which the collaboration processing on the part of the information terminal 22 is carried out based on the commands sent from the mobile terminal 21. In such a case, the collaboration execution unit 64 can carry out the collaboration processing on the part of the information terminal 22 autonomously eliminating the need for operating the operation unit 65, i.e., automatically. This means that the user can remotely control the information terminal 22 by use of the mobile terminal 21 without operating the operation unit 65 of the information terminal 22.

The display unit 66 displays various images as appropriate during execution of the collaboration processing on the part of the information terminal 22 by the collaboration execution unit 64.

The storing unit 63 can store not only the collaboration information but also data of an image such as a still image and a moving image. In such a case, the display unit 66 displays the image expressed by the image data based on the control of the collaboration execution unit 64.

In the following, first and second examples will be described as specific examples of the collaboration processing carried out by the information processing system having such a functional configuration of FIG. 2.

The first specific example is one example of the collaboration processing that installs an extension function of an image display function of the information terminal 22, more specifically, such a function that enables a special image display operation, as a new function of the information terminal 22 and causes the information terminal 22 to implement the new function by way of remote control from the mobile terminal 21. In the first specific example, a set of constituent elements of a predetermined application code, i.e., a control program executed on the part of the mobile terminal 21, a control program executed on the part of the information terminal 22, and a command set used in the application code, are employed as the collaboration information set. Hereinafter, such a first specific example of the collaboration processing is referred to as "application execution collaboration processing".

Incidentally, the long distance communication control unit 67 is not a requisite for the information terminal 22 to carry out the first specific example of the collaboration processing. It is rather desirable not to incorporate the long distance communication control unit 67 in the information terminal 22 main body for the purpose of reducing the cost and the size of the device.

The second specific example is an example of the collaboration processing that installs an extension function of image display function, more specifically, such a function that acquires image data to be displayed from the server 12, as a new function of the information terminal 22, and causes the information terminal 22 to implement the new function by way of remote control from the mobile terminal 21. In the second specific example, information to allow the transmission of image data from the server 12, more specifically, a set of ID and password, is employed as the collaboration information set. Hereinafter, such a second specific example of the collaboration processing is referred to as "ID image displaying collaboration processing".

In this case, the long distance communication control unit 67 is a requisite for the information terminal 22 to carry out the second specific example of the collaboration processing.

First, the application execution collaboration processing will be described with reference to FIGS. 3 and 4.

Figure 3:
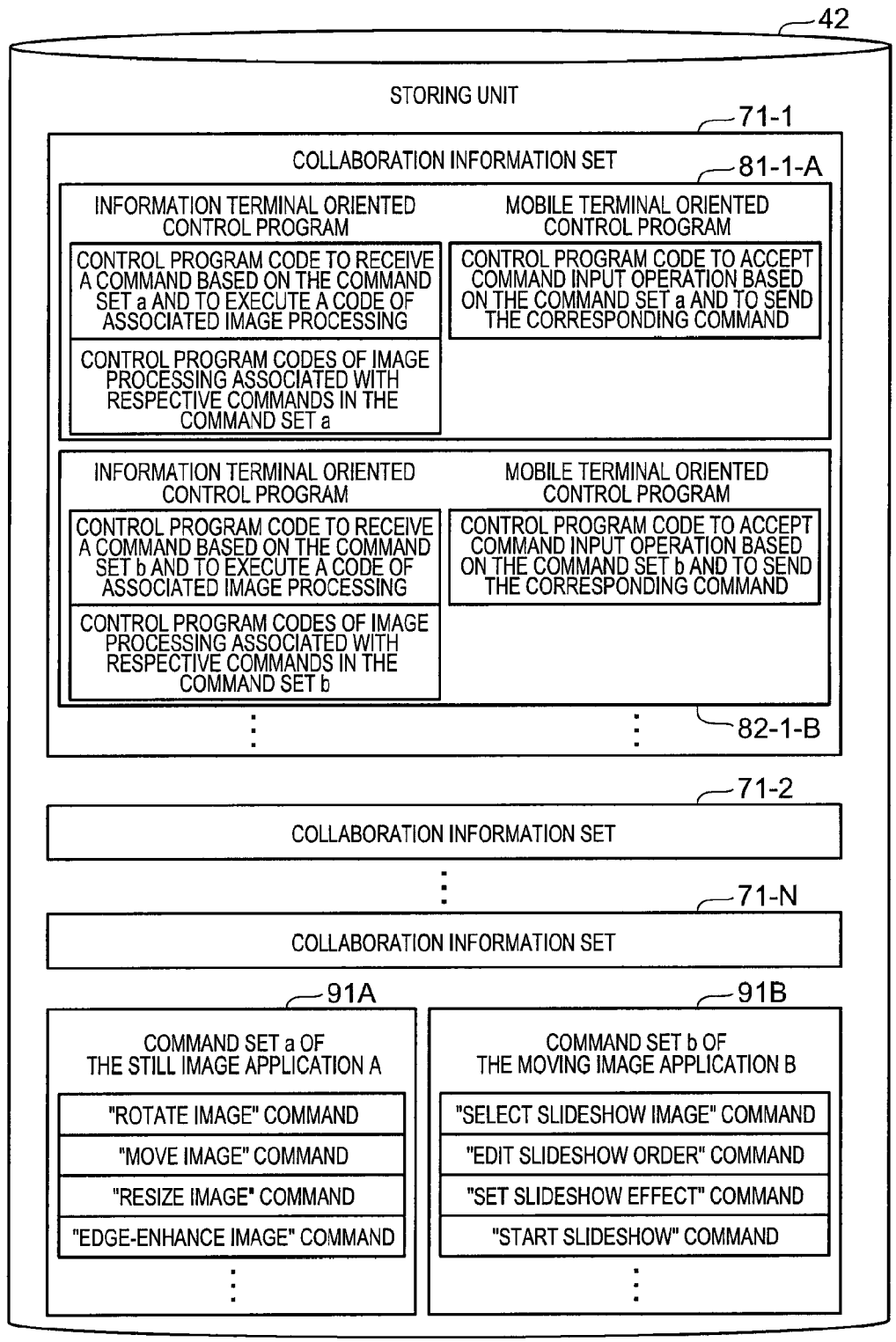
FIG. 3 is a diagram illustrating application execution collaboration processing as one example of the collaboration processing carried out by the information processing system of FIG. 2, showing one example of storage contents in the storing unit 42 of the server of the information processing system of FIG. 2.

FIG. 3 is a diagram showing one example of storage contents in the storing unit 42 of the server 12 when the application execution collaboration processing is carried out.

In the present embodiment, as described above, the collaboration systems 11-1 to 11-N of FIG. 1 are different from one another in model of constituent elements. Therefore, the storing unit 42 stores collaboration information sets 71-1 to 71-N, which include respective pieces of collaboration information different from one another, but causes the respective collaboration systems 11-1 to 11-N to implement the same new function.

More specifically, the collaboration information set 71-1, which corresponds to the collaboration system 11-1, includes a collaboration information set 81-1-A having an application code (hereinafter, referred to as "still image application A") that enables an extension function of a still image display function and a collaboration information set 82-1-B having an application code (hereinafter, referred to as "moving image application B") that enables an extension function of a moving image display function.

Here, for ease of description, the collaboration information set 81-1-A for the still image application A and the collaboration information set 82-1-B for the moving image application B are illustrated only for the collaboration information set 71-1 in FIG. 3, as an example.

That is, if K is defined as an arbitrary integer between 1 and N, though any collaboration information set for K other than K=1 is not illustrated in FIG. 3, it is assumed that the collaboration information set 71-K includes the collaboration information set 81-K-A for the still image application A and the collaboration information set 82-K-B for the moving image application B.

In the following, the collaboration systems 11-1 to 11-N are inclusively referred to as "collaboration system 11" unless distinction of individual collaboration systems is necessary. In this case, the collaboration information sets 71-1 to 71-N are inclusively referred to as "collaboration information set 71", the collaboration information sets 81-1-A to 81-N-A are inclusively referred to as "collaboration information set 81A", and the collaboration information sets 82-1-B to 82-N-B are inclusively referred to as "collaboration information set 82B".

The collaboration information set 81A for the still image application A includes a information terminal oriented control program, a mobile terminal oriented control program, and a command set a of the still image application A.

Here, it should be noted that the command set a of the still image application A is not illustrated in the block of the collaboration information set 81-1-A but in the different block 91A because the same command set a is common to all of the collaboration information sets 81-1-A to 81-N-A for the still image application A. That is, in the present embodiment, the command set a for the still image application A is stored in the storing unit 42 as data 91A different from the collaboration information sets 81-1-A to 81-N-A for the still image application A. However, when the collaboration information set 81-K-A for the still image application A is sent to the collaboration system 11-K, the command set a of the still image application A is included in the collaboration information set 81-K-A for the still image application A as one constituent element and sent along with the information terminal oriented control program and the mobile terminal oriented control program.

The information terminal oriented control program in the collaboration information set 81A for the still image application A includes a control program code to receive a command based on the command set a and to execute a code of associated image processing and control program codes of image processing respectively associated with corresponding commands in the command set a.

The mobile terminal oriented control program in the collaboration information set 81A for the still image application A includes a control program code to accept a command input operation based on the command set a and to send the corresponding command.

The command set a of the still image application A in the collaboration information set 81A for the still image application A is a set of various commands such as "rotate image" command, "move image" command, "resize image" command, and "edge-enhance image" command.

The collaboration information set 82B for the moving image application B includes a information terminal oriented control program, a mobile terminal oriented control program, and a command set b of the moving image application B.

Here, it should be noted that the command set b of the moving image application B is not illustrated in the block of the collaboration information set 82-1-B but in the different block 91B because the command set b is common to all of the collaboration information sets 82-1-B to 82-N-B for the moving image application B. That is, in the present embodiment, the command set b for the moving image application B is stored in the storing unit 42 as data 91B different from the collaboration information sets 82-1-B to 82-N-B for the moving image application B. However, when the collaboration information set 82-K-B for the moving image application B is sent to the collaboration system 11-K, the command set b of the moving image application B is included in the collaboration information set 82-K-B for the moving image application B and sent along with the information terminal oriented control program and the mobile terminal oriented control program.

The information terminal oriented control program in the collaboration information set 82B for the moving image application B includes a control program code to receive a command based on the command set b and to execute a code of associated image processing and control program codes of image processing respectively associated with corresponding commands in the command set b.

The mobile terminal oriented control program in the collaboration information set 82B for the moving image application B includes a control program code to accept command input operation based on the command set b and to send the corresponding command.

The command set b of the moving image application B in the collaboration information set 82B for the moving image application B is a set of various commands such as "select slideshow image" command, "edit slideshow order" command, "set slideshow effect" command, and "start slideshow" command.

Figure 4:
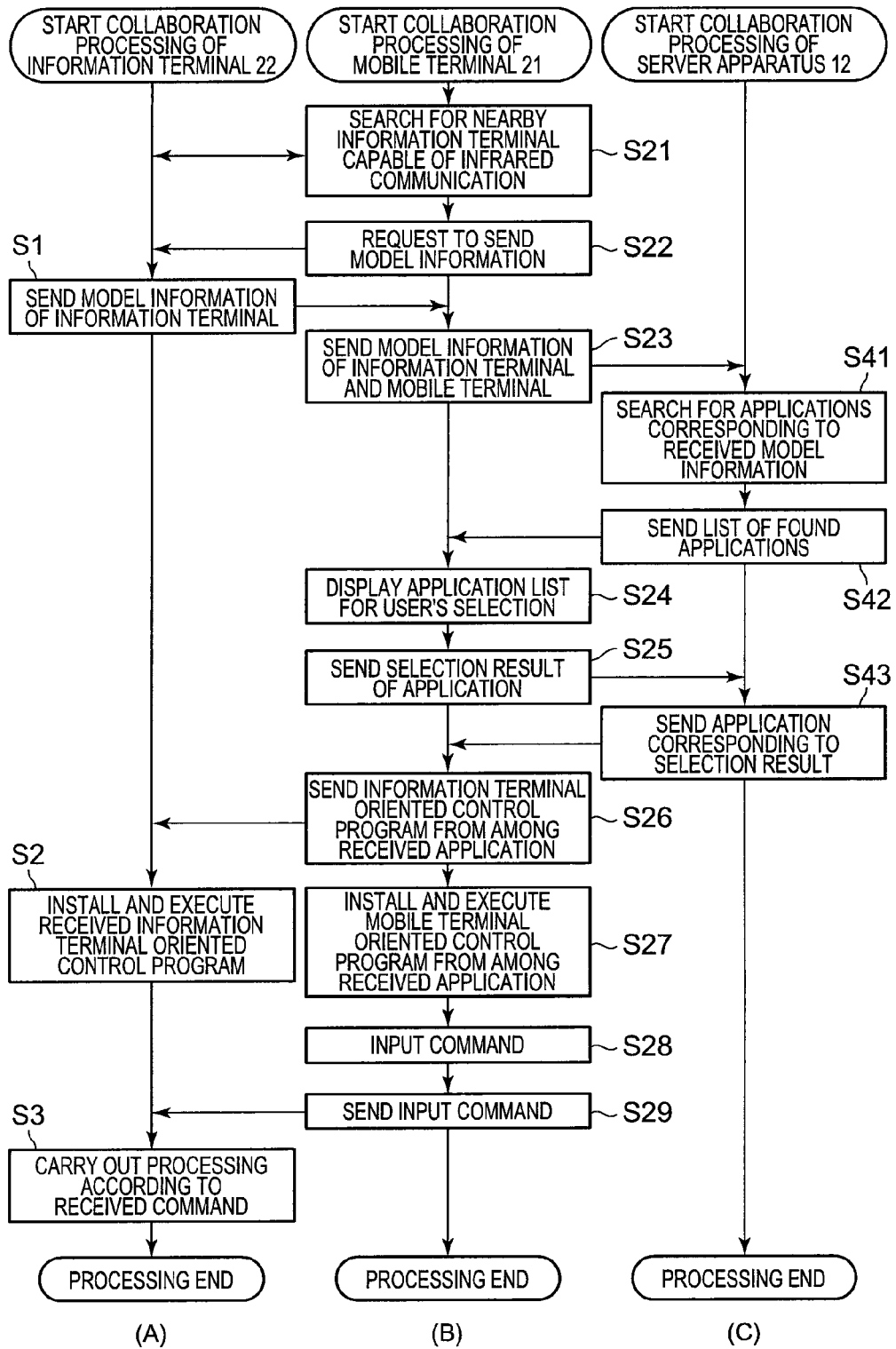
FIG. 4 is a flowchart explaining application execution collaboration processing as one example of the collaboration processing carried out by the information processing system of FIG. 2.

FIG. 4 is a flowchart showing one example of flow of the application execution collaboration processing in a case in which the collaboration information shown in FIG. 3 is stored in the storing unit 42 of the server 12.

FIG. 4 is a flowchart showing one example of flow of the application execution collaboration processing for each of the information terminal 22, the mobile terminal 21, and the server 12.

In step S21 of FIG. 4, the short distance communication control unit 55 of the mobile terminal 21 of FIG. 2 searches for an information terminal 22 capable of infrared communication (short distance communication).

When an information terminal 22 capable of infrared communication is found, control proceeds to step S22. Here, in a case in which a plurality of information terminals have been found, the mobile terminal 21 may select one information terminal as a target of collaboration from among the found information terminals, in response to user's operation or the like.

In step S22, the short distance communication control unit 55 of the mobile terminal 21 requests the information terminal 22 thus found (and selected) to send model information.

In step S1 of FIG. 4, the short distance communication control unit 61 of the information terminal 22 sends the model information of the information terminal 22 to the mobile terminal 21.

The short distance communication control unit 55 of the mobile terminal 21 receives the model information of the information terminal 22 and supplies the model information to the collaboration information acquisition control unit 52 via the storing unit 53. In this way, in the application execution collaboration processing on the part of the mobile terminal 21 of FIG. 4, control proceeds to step S23.

In step S23, the collaboration information acquisition control unit 52 of the mobile terminal 21 controls the long distance communication control unit 51 to send the model information of the mobile terminal 21 and the information terminal 22 to the server 12 via the network 31.

In step S41 of FIG. 4, the long distance communication control unit 43 of the server 12 receives the model information of the mobile terminal 21 and the information terminal 22 and searches the storing unit 42 for the application codes corresponding to the received model information, i.e., the collaboration information set corresponding to the combination of the received model information of the mobile terminal 21 and the received model information of the information terminal 22.

In step S42, the long distance communication control unit 43 of the server 12 sends a list of the found application codes, i.e., a list showing the collaboration information set, to the mobile terminal 21 via the network 31.

More specifically, for example, when the server 12 receives the model information of the mobile terminal 21-1 and the information terminal 22-1, the collaboration information set 71-1 of FIG. 3 is found in the process of step S41. Then, in the process of step S42, the list showing the collaboration information set 71-1 of FIG. 3, i.e., the list showing the still image application A and the moving image application B is sent to the mobile terminal 21.

In step S24 of FIG. 4, the collaboration information acquisition control unit 52 of the mobile terminal 21 controls the long distance communication control unit 51 to receive the list of application codes and displays the received list of application codes on a display unit (not shown in FIG. 2) and accepts user's selection operation.

When the user operates the operation unit 56 to select an application code from the list of application codes, the collaboration information acquisition control unit 52 of the mobile terminal 21 recognizes the selection result, and control proceeds to step S25.

In step S25, the collaboration information acquisition control unit 52 of the mobile terminal 21 controls the long distance communication control unit 51 to send the selection result to the server 12 via the network 31.

More specifically, for example, in the process of step S24, it is assumed that the list showing the still image application A and the moving image application B is displayed on the display unit (not shown) and that the user viewing the list operates the operation unit 56 to select the still image application A. Then, in the process of step S25, information that designates the still image application A is sent to the server 12 via the network 31.

In step S43 of FIG. 4, the long distance communication control unit 43 of the server 12 receives the selection result from the mobile terminal 21, reads from the storing unit 42 an application code, i.e., a collaboration information set corresponding to the selection result, and sends the application code to the mobile terminal 21 via the network 31. As a result thereof, the application execution collaboration processing on the part of the server 12 of FIG. 4 ends.

More specifically, for example, when the selection result designating the still image application A is sent from the mobile terminal 21-1, the following process is carried out as the process of step S43. First, the collaboration information set 81-1-A for the still image application A is read from the storing unit 42. At the same time, the command set a of the still image application A stored in the storing unit 42 as the data 91A of FIG. 3 is read as well. Next, the collaboration information set 81-1-A for the still image application A including the command set a of the still image application A, the mobile terminal oriented control program, and the information terminal oriented control program is sent from the server 12 to the mobile terminal 21-1 via the network 31.

The collaboration information acquisition control unit 52 of the mobile terminal 21 controls the long distance communication control unit 51 to receive the application code (the collaboration information set) from the server 12 and store it in the storing unit 53. In this way, in the application execution collaboration processing on the part of the mobile terminal 21 of FIG. 4, control proceeds to step S26.

In step S26, the collaboration control unit 54 of the mobile terminal 21 reads the information terminal oriented control program from the application code stored in the storing unit 53 and controls the short distance communication control unit 55 to send the information terminal oriented control program to the information terminal 22.

In step S27, the collaboration control unit 54 of the mobile terminal 21 installs the mobile terminal oriented control program from the application code stored in the storing unit 53. Then, the collaboration control unit 54 executes the mobile terminal oriented control program. Here, although the mobile terminal oriented control program is assumed to be installed in an area within the storing unit 53, the present invention is not particularly limited thereto. The mobile terminal oriented control program may be installed in a memory, not illustrated in FIG. 2.

As described above, in the example of FIG. 4, from the application code (collaboration information set) stored in the storing unit 53, the information terminal oriented control program, which is sent to the information terminal 22 in the process of step S26, is the information terminal oriented information. On the other hand, the mobile terminal oriented control program, which is installed on the part of the mobile terminal 21 in the process of step S27, is one example of the mobile terminal oriented information.

More specifically, for example, it is assumed that the collaboration information set 81-1-A including the command set a of the still image application A, the mobile terminal oriented control program, and the information terminal oriented control program is received by the mobile terminal 21-1, in accordance with the above example. In such a case, in the process of step S26, the information terminal oriented control program is sent to the information terminal 22-1 as the information terminal oriented information. Also, in the process of step S27, the mobile terminal oriented control program is installed and executed in the mobile terminal 21-1 as the mobile terminal oriented information.

On the other hand, the short distance communication control unit 61 of the information terminal 22, which have received the information terminal oriented control program from the mobile terminal 21, provides the information terminal oriented control program to the collaboration information acquisition control unit 62. In this way, control proceeds to step S2 in the application execution collaboration processing on the part of the information terminal 22 of FIG. 4.

In step S2, the collaboration information acquisition control unit 62 of the information terminal 22 installs the information terminal oriented control program that has been received. Then, the collaboration execution unit 64 executes the information terminal oriented control program. Here, although the information terminal oriented control program is assumed to be installed in an area within the storing unit 63, the present invention is not particularly limited thereto. The information terminal oriented control program may be installed in a memory, not illustrated in FIG. 2.

Meanwhile, the collaboration control unit 54 of the mobile terminal 21 is ready to accept user's command operation such as a key operation via the operation unit 56.

When user's command operation such as a key operation is accepted, control proceeds to step S28 in the application execution collaboration processing on the part of the mobile terminal 21 of FIG. 4.

The processes hereinafter are controlled by executing the mobile terminal oriented control program that has been installed in step S27.

In step S28, the collaboration control unit 54 of the mobile terminal 21 converts the command operation such as a key operation into a command comprehensible to the information terminal 22. That is, a command associated with the command operation such as a key operation is read from the command set stored in the storing unit 53.

In step S29, the collaboration control unit 54 of the mobile terminal 21 controls the short distance communication control unit 55 to send the converted command to the information terminal 22.

Meanwhile, the collaboration information acquisition control unit 62 of the information terminal 22 controls the short distance communication control unit 61 to check whether or not a command (a component of the collaboration information set) is sent from the mobile terminal 21.

The processes hereinafter are controlled by executing the information terminal oriented control program that has been installed in step S2.

When a command is sent from the mobile terminal 21 in the process of step S29 described above, the collaboration information acquisition control unit 62 controls the short distance communication control unit 61 to receive the command and store it in the storing unit 63. In this way, control proceeds to step S3 in the application execution collaboration processing on the part of the information terminal 22 of FIG. 4.

In step S3, the collaboration execution unit 64 of the information terminal 22 carries out processing according to the received command. That is, the collaboration execution unit 64 of the information terminal 22 interprets the command and, based on the interpretation, carries out operation according to the extension function of image display function.

For example, since the process of step S3 is dependent on the still image application A or the moving image application B of FIG. 3, various types of image display processing are carried out as the process of step S3. That is, various types of control processing are carried out to display still images or moving images on the display unit 66.

More specifically, for example, it is assumed that the collaboration information set 81A for the still image application A including the command set a of the still image application A, the mobile terminal oriented control program, and the information terminal oriented control program is employed, in accordance with the example described above.

Here, it is also assumed that the user wishes and instructs to rotate the still image displayed on the display unit 66 of the information terminal 22 by way of operation on the mobile terminal 21.

In such a case, in the processes of steps S27 and S28 on the part of the mobile terminal 21, the "rotate image" command from the command set a of the still image application A shown in FIG. 3 is input and sent to the information terminal 22.

Then, the information terminal 22 carries out the control processing to rotate the still image displayed on the display unit 66 according to the "rotate image" command.

When the command is sent from the mobile terminal 21 to the information terminal 22 in this way, the application execution collaboration processing on the part of the mobile terminal 21 of FIG. 4 ends. On the other hand, when the information terminal 22 has carried out the processing according to the command, the application execution collaboration processing on the part of the information terminal 22 of FIG. 4 ends.

This means that, for example, the mobile terminal 21, in accordance with the mobile terminal oriented control program, which has been installed, converts a command triggered by the pressing of the key "1", which is usually a key to input the number "1", into "data 1", which is a command to instruct the information terminal 22 to "rotate image". Thus, the mobile terminal 21 can implement a new function of sending a command "data 1" to the information terminal 22 according to the user's operation on the key "1" thereof.

Then, the information terminal 22, in accordance with the information terminal oriented control program, which has been installed, interprets the "data 1" received by the short distance communication control unit 61 as the command data designating "rotate image", and can implement a new function of carrying out image processing associated with the "rotate image" command upon receiving "data 1" from the mobile terminal 21.

In this way, by simultaneously installing the mobile terminal oriented control program and the information terminal oriented control program, which are associated with each other, respectively on the mobile terminal 21 and the information terminal 22, the system including the mobile terminal 21 and the information terminal 22 can implement a new function of controlling the image display on the information terminal 22 by using the operation unit of the mobile terminal 21.

After that, as long as the mobile terminal oriented control program for the still image application A is not uninstalled and the mobile terminal 21 retains the command set a of the still image application A, the mobile terminal 21 can repeatedly carry out the processes of steps S28 and S29 for the still image application A. Similarly, as long as the information terminal oriented control program for the still image application A is not uninstalled, the information terminal 22 can repeatedly carry out the process of step S3 for the still image application A.

Therefore, the user can remotely control the information terminal 22 in accordance with the still image application A as many times as necessary by using the mobile terminal 21.

More specifically, for example, it is assumed that the user wishes and instructs to move the still image displayed on the display unit 66 of the information terminal 22 by operation on the mobile terminal 21.

In such a case, the processes of steps S28 and S29 are carried out again, i.e., the "move image" command from the command set a of the still image application A shown in FIG. 3 is input on the part of the mobile terminal 21 and sent to the information terminal 22.

Then the information terminal 22 carries out the control processing to move the still image displayed on the display unit 66 according to the "move image" command.

In the above, a description has been given of the application execution collaboration processing as a specific example of the collaboration processing carried out by the information processing system of FIG. 2 with reference to FIGS. 3 and 4.

Next, in the following, a description will be given of the ID image display collaboration processing as another specific example of the collaboration processing with reference to FIG. 5.

Figure 5:
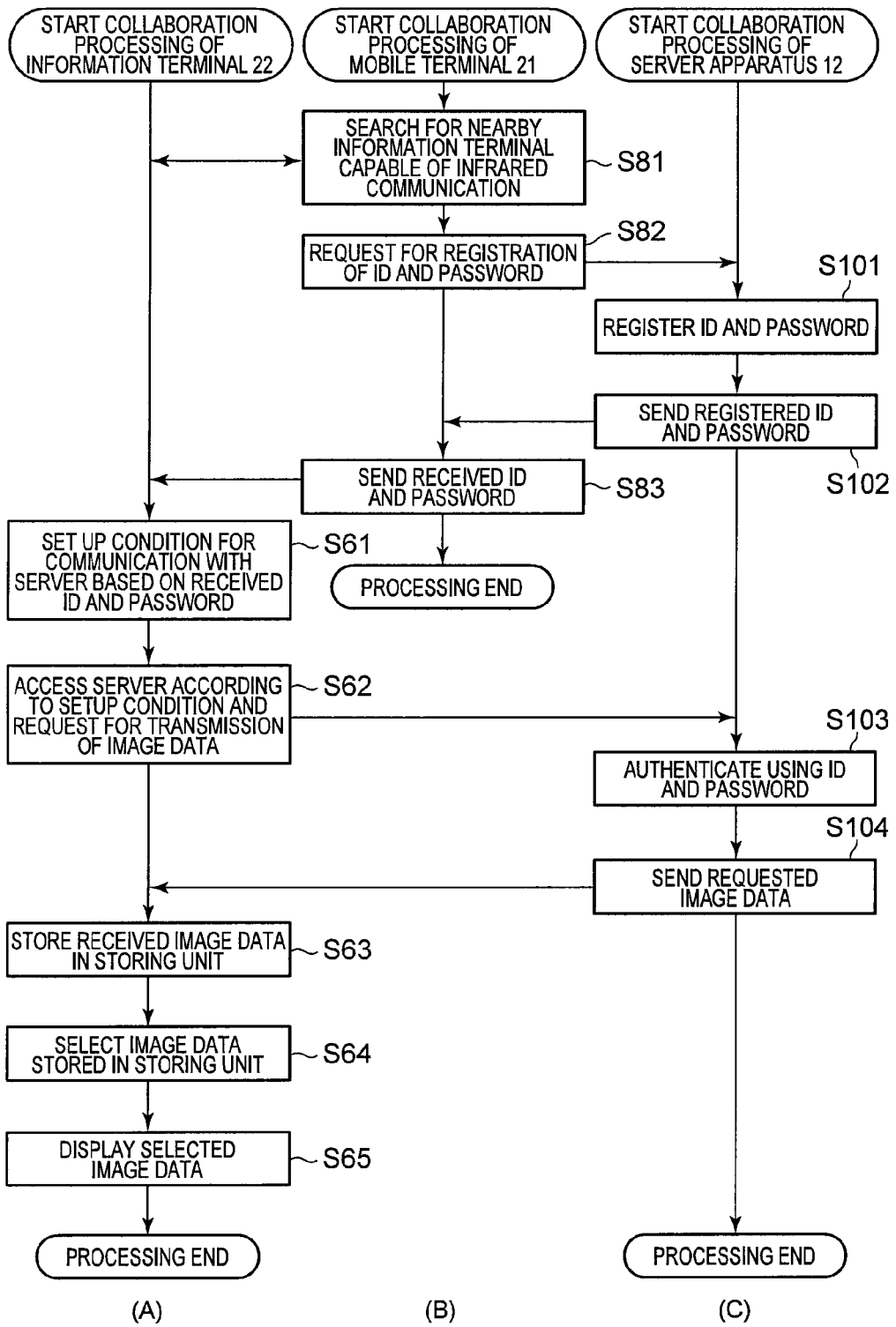
FIG. 5 is a flowchart explaining ID image display collaboration processing as another example of the collaboration processing carried out by the information processing system of FIG. 2.

FIG. 5 is a flowchart showing one example of flow of the ID image display collaboration processing.

FIG. 5 is a flowchart showing one example of flow of the ID image display collaboration processing for each of the information terminal 22, the mobile terminal 21, and the server 12.

In step S81 of FIG. 5, the short distance communication control unit 55 of the mobile terminal 21 of FIG. 2 searches for an information terminal 22 capable of infrared communication (short distance communication).

When an information terminal 22 capable of infrared communication is found, the search result is informed to the collaboration information acquisition control unit 52, and control proceeds to step S82.

In step S82, the collaboration information acquisition control unit 52 of the mobile terminal 21 controls the long distance communication control unit 51 to send the request for registration of ID and password to the server 12 via the network 31.

In step S101 of FIG. 5, the long distance communication control unit 43 of the server 12, which has received the request for registration, registers a set of ID and password in the storing unit 42.

In the case in which the ID image display collaboration processing is carried out, a new function is installed to the information terminal 22 that enables the server 12 to send image data to be displayed to the information terminal 22. For this purpose, the set of ID and password is registered in the storing unit 42 as the permission information of sending such image data. This means that the set of ID and password is used as the collaboration information set.

In step S102, the long distance communication control unit 43 of the server 12 sends the registered ID and password to the mobile terminal 21 via the network 31.

The collaboration information acquisition control unit 52 of the mobile terminal 21 controls the long distance communication control unit 51 to receive the ID and password, and store it in the storing unit 53. In this way, control proceeds to step S83 in the ID image display collaboration processing on the part of the mobile terminal 21 of FIG. 5.

In step S83, the collaboration control unit 54 of the mobile terminal 21 reads the ID and password stored in the storing unit 53 and controls the short distance communication control unit 55 to send the ID and password to the information terminal 22.

As a result thereof, the ID image display collaboration processing on the part of the mobile terminal 21 of FIG. 5 ends.

On the other hand, the short distance communication control unit 61 of the information terminal 22, which has received the ID and password from the mobile terminal 21, provides the ID and password to the collaboration information acquisition control unit 62. In this way, the ID image display collaboration processing on the part of the information terminal 22 of FIG. 5 starts.

In step S61, the collaboration information acquisition control unit 62 of the information terminal 22 sets up a condition for communication with the server 12 based on the received ID and password.

In step S62, the collaboration information acquisition control unit 62 of the information terminal 22 controls the long distance communication control unit 67 to access the server 12 according to the setup condition for communication and to request for transmission of the image data.

In step S103 of FIG. 5, the long distance communication control unit 43 of the server 12, which has received the request for transmission, authenticates the information terminal 22 based on the ID and password included in the request.

When the information terminal 22 is successfully authenticated, control proceeds to step S104. In step S104 of FIG. 5, the long distance communication control unit 43 of the server 12 reads the image data requested by the information terminal 22 from the storing unit 42 and sends it to the information terminal 22 via the network 31.

As a result thereof, the ID image display collaboration processing on the part of the server 12 of FIG. 5 ends.

On the other hand, the long distance communication control unit 67 of the information terminal 22, which has received the image data from the server 12, provides the image data to the collaboration information acquisition control unit 62. In this way, control proceeds to step S63 in the ID image display collaboration processing on the part of the information terminal 22 of FIG. 5.

In step S63, the collaboration information acquisition control unit 62 of the information terminal 22 stores the received image data in the storing unit 63.

Here, there can be a case in which data of a plurality of images is sent and stored in the storing unit 63. For this reason, in step S64, the collaboration execution unit 64 selects data of an image to be displayed from the data of images stored in the storing unit 63.

The method of selection in this case is not limited, and such a method can be employed that the user operates the operation unit 65 to select data of a desired image, for example. Furthermore, for example, such a method can be employed that the collaboration execution unit 64 selects data of an image autonomously without intervening user operation, i.e., automatically. Furthermore, for example, such a method can be employed that the mobile terminal 21 selects data of an image via a remote control.

In step S65, the collaboration execution unit 64 reads the selected image data from the storing unit 63 and causes the display unit 66 to display the image expressed by the image data.

As a result thereof, the ID image display collaboration processing on the part of the information terminal 22 of FIG. 5 ends.

After that, as long as the image data is not deleted from the storing unit 63, the information terminal 22 can repeatedly carry out the processes of steps S64 and S65, i.e., it is possible to change the image displayed on the display unit 66.

As described above, from the viewpoint of the mobile terminal 21 according to the present embodiment, the information terminal 22 is a controlled device and the server 12 is an external device.

In this case, the external device maintains such information that enables two devices to operate in collaboration with each other, and one of the two collaborating devices to implement a new function as collaboration information.

The mobile terminal 21 includes a first communication control unit (the long distance communication control unit 51) that controls communication with the external device and a second communication control unit (the short distance communication control unit 55) that controls communication between the own device (the mobile terminal 21) and the controlled device (information terminal 22) operating in collaboration with the own device (the mobile terminal 21).

Also, the mobile terminal 21 includes an acquisition control function that carries out control of acquiring the collaboration information from the external device via the first communication control unit.

Furthermore, the mobile terminal 21 includes a collaboration control function that controls the operation of the controlled device via the second communication control unit based on the collaboration information acquired by implementing the acquisition control function and thereby causes the new function to be implemented on the part of the controlled device.

On the other hand, from the viewpoint of the information terminal 22 according to the present embodiment, the mobile terminal 21 is a controlling device and the server 12 is an external device.

In this case, the information terminal 22 includes a communication control unit (the short distance communication control unit 61) that controls communication between the own device (information terminal 22) and the controlling device operating in collaboration with the own device.

Furthermore, the information terminal 22 includes an acquisition control function that carries out control of acquiring a part of the collaboration information or acquisition control information based on the collaboration information via the communication control unit when the controlling device has acquired the collaboration information from the external device and has sent such a part of collaboration information or such control information.

Furthermore, the information terminal 22 is provided with a collaboration execution function that causes a new function to be implemented on the part of the own device (information terminal 22) based on at least one of the two kinds of information, a part of the collaboration information and the control information, acquired by implementing the acquisition control function.

Thus, it becomes possible that the mobile terminal 21 and the information terminal 22 collaborate, a new function is installed into the information terminal 22, and the new function is implemented on the part of the information terminal 22 by way of remote control from the mobile terminal 21.

As a result of this, the user can easily (without careful reading of an operation manual or the like) use the unfamiliar information terminal 22 by using the well accustomed mobile terminal 21.

It should be noted that the present invention is not limited to the embodiment described above, and any modifications and improvements thereto within the scope that can realize the object of the present invention are included in the present invention.

For example, in the embodiment described above, a set of ID and password to access the server 12 has been employed as the collaboration information in the ID image display collaboration processing of FIG. 5. However, the present invention is not limited thereto.

Alternatively, those such as an address of an external device including the server 12, ID or password to access such an external device, an address of a relay device to the network 31 such as a wireless access point, or ID or password to access such a relay device can be employed as the collaboration information.

In such cases, the information terminal 22 can set up a condition for communication not only with the server 12 but also with an external device (including image display device), a relay device, and the like.

Furthermore, for example, in the embodiment described above, in the ID image display collaboration processing of FIG. 5, the ID and password sent from the server 12 in the process of step S102 is immediately sent to the information terminal 22 in the process of step S83.

As an alternative to such a process, the mobile terminal 21 may determine whether or not the transmission of the ID and password to the information terminal 22 is allowed before step S102, and, only if the transmission of the ID and password is determined to be allowed, the mobile terminal 21 may send the ID and password to the information terminal 22.

In this way, also by determining and controlling whether or not the transmission of the collaboration information (ID and password, in this case) to the information terminal 22 is allowed, the mobile terminal 21 can control the operation on the part of the information terminal 22, related to the new function (the function to acquire image data from the server 12, in this case).

Furthermore, for example, in the embodiment described above, in the application execution collaboration processing of FIG. 4, the information terminal oriented control program (the information terminal oriented information from the collaboration information set) provided from the server 12, which has been sent from the mobile terminal 21 to the information terminal 22 in the process of step S26, is immediately installed and executed on the part of the information terminal 22 in the process of step S2.

As an alternative to such a process, the mobile terminal 21 may issue a command that instructs execution of the information terminal oriented control program. This means that the information terminal 22 may install and execute the information terminal oriented control program only after receiving such a command.

In this way, also by determining and controlling whether or not the execution of the collaboration information (information terminal oriented control program, in this case) on the part of the information terminal 22 is allowed, the mobile terminal 21 can control the operation on the part of the information terminal 22, related to the new function (the function that enables a special image display control, in this case).

Furthermore, in the embodiment described above, a description has been given in which the information processing apparatus according to the present invention is configured by a mobile terminal or an information terminal. However, the present invention is not limited to a mobile terminal or an information terminal and can be applied to any electronic device having a communication function. More specifically, the present invention can be applied to a video camera, a portable navigation device, a portable game device, and the like.

The series of processing described above can be executed by hardware and also can be executed by software.

Figure 6:
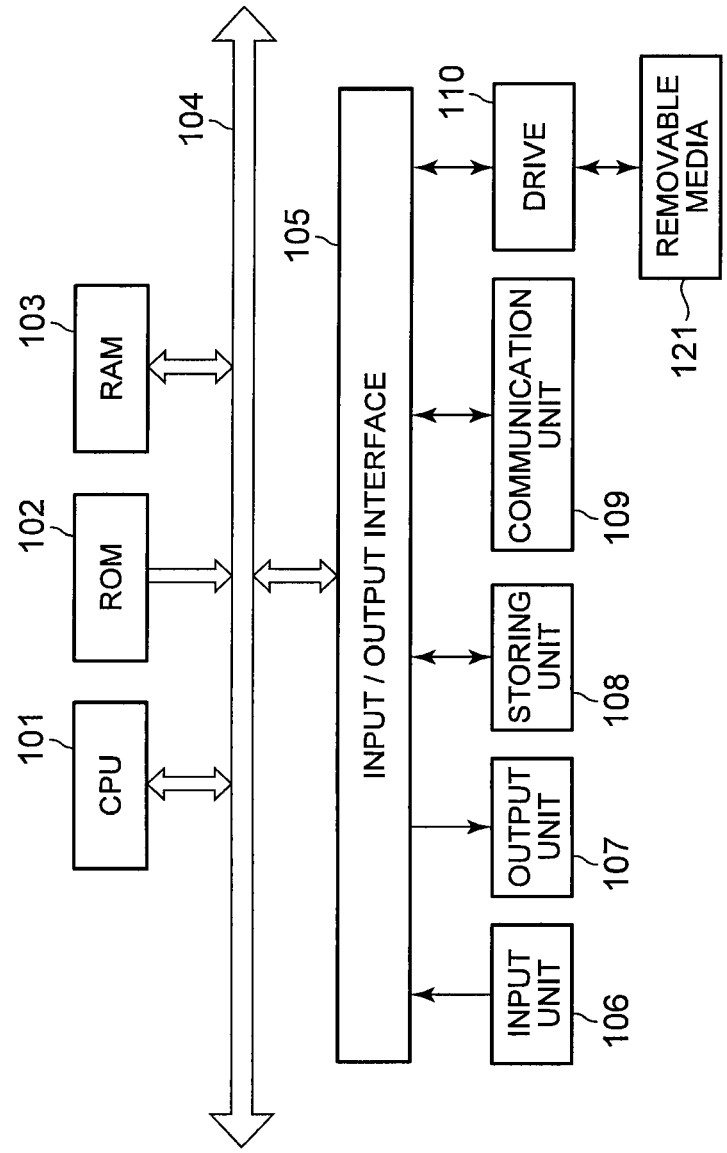
FIG. 6 is a block diagram showing a hardware configuration of the server, the mobile terminal, or the information terminal from among the information processing system of FIG. 2.

FIG. 6 is a block diagram showing a hardware configuration of the server 12, the mobile terminal 21, or the information terminal 22 in a case in which the series of processing described above is executed by software.

Hereinafter, the server 12, the mobile terminal 21, or the information terminal 22 shown in FIG. 6 is inclusively referred to as "information processing apparatus".

The information processing apparatus is provided with a CPU (Central Processing Unit) 101, a ROM (Read Only Memory) 102, a RAM (Random Access Memory) 103, a bus 104, an input/output interface 105, an input unit 106, an output unit 107, a storing unit 108, a communication unit 109, and a drive 110.

The CPU 101 executes various processes according to programs that are stored in the ROM 102. Alternatively, the CPU 101 may execute various processes according to programs that are loaded from the storing unit 108 to the RAM 103.

The RAM 103 also stores data and the like necessary for the CPU 101 to execute the various processes as appropriate.

The CPU 101, the ROM 102, and the RAM 103 are connected to each other via the bus 104. The bus 104 is also connected with the input/output interface 105. The input unit 106, the output unit 107, the storing unit 108, the communication unit 109, and the drive 110 are connected to the input/output interface 105.

The input unit 106 is configured by a keyboard, a mouse, various keys, and the like. The output unit 107 is configured by a display unit, a sound output unit, and the like. The storing unit 108 is configured by a hard disk and the like. The communication unit 109 controls communication with other devices via the network 31 including the Internet, i.e., the long distance communication. The communication unit 109 also controls short distance communication as needed.

To the drive 110, removable media 121 such as a magnetic disk, an optical disk, a magneto-optical disk, or a semiconductor memory may be mounted as appropriate. Programs read by the drive 110 are installed in the storing unit 108 or the like as needed.

In a case in which the series of processing is to be executed by software, the program configuring the software is installed from a network or a storage medium in a computer or the like. The computer may be a computer incorporated in dedicated hardware. Alternatively, the computer may be a computer capable of executing various functions by installing various programs, i.e., a general-purpose personal computer, for example.

The storage medium containing the program can be configured not only by the removable media 121 distributed separately from the device main body for supplying the program to a user, but also by a storage medium or the like supplied to the user in a state incorporated in the device main body in advance. The removable media is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the ROM 102 storing the program, a hard disk and the like included in the storing unit 108, for example.

It should be noted that, in the present description, the step describing the program stored in the storage medium includes not only the processing executed in a time series following this order, but also includes processing executed in parallel or individually, which is not necessarily executed in a time series.

In the present description, a system indicates the whole of devices consisting of a plurality of devices and processing units.

What is claimed is:

1. A control system comprising an information terminal as a controlled device, a mobile terminal as a controlling device, and a server apparatus, wherein the controlled device, the controlling device, and the server apparatus are communicatively connected to one another, and wherein:

the server apparatus comprises:
   a memory that stores (i) a plurality of sets of collaboration information each of which is usable to cause the controlled device and the controlling device to operate in collaboration with each other, each of the plurality of sets of collaboration information including conversion information for converting a key operation input at the controlling device into a command comprehensible by the controlled device, and (ii) a plurality of command sets each of which comprises a set of control commands, each of the plurality of command sets being common to all of the plurality of sets of collaboration information, wherein each of the plurality of sets of collaboration information is stored in the memory for a respective one of a plurality of combinations of controlled devices of different types and controlling devices of different types; and
   a first processor that, when a transmission request for collaboration information designating a type of controlled device and a type of controlling device is sent from the controlling device, performs control to select collaboration information and a command set corresponding to a combination of the type of the controlled device having been designated and the type of the controlling device having been designated, from among the plurality of sets of the collaboration information and the plurality of command sets stored in the memory, and to send the collaboration information and the command set having been selected to the controlling device, the controlling device comprises:
   an operation interface that is configured by various keys and that accepts input of a key operation by a user; and
   a second processor that performs control to (i) send the transmission request for collaboration information designating the type of controlled device and the type of controlling device to the server apparatus and receive the collaboration information and the command set having been selected and sent from the server apparatus in response to the transmission request, (ii) send the collaboration information and the command set having been received from the server apparatus to the controlled device designated by the type, (iii) convert, using the conversion information included in the collaboration information having been received from the server apparatus, data of the input key operation accepted by the operation interface into data indicating a control command from among the control commands of the command set having been received from the server apparatus, and (iv) send the converted data indicating the control command to the controlled device designated by the type, and the controlled device comprises:
   a third processor that performs control to receive the collaboration information and the command set sent from the controlling device, and to control the controlled device to operate in accordance with a new function by executing the control command indicated by the converted data sent from the controlling device based on the collaboration information and the command set having been received from the controlling device.

2. The control system as set forth in claim 1, wherein:
the second processor performs control to send, to the controlled device, a program included in a portion of the collaboration information, and
the third processor performs control to receive the program included in the portion of the collaboration information sent from the controlling device and to process the control command indicated by the converted data sent from the controlling device by executing the program having been received.

3. The control system as set forth in claim 2, wherein the collaboration information stored in the memory includes:
a first control program that causes the controlled device to operate in the collaboration; and
a second control program that causes the controlling device to operate in the collaboration,
wherein:
the second processor performs control to send the first control program included in the collaboration information received from the server apparatus to the controlled device designated by the type, and controls the controlled device to execute the first control program,
the second processor itself performs control to execute the second control program included in the collaboration information received from the server apparatus, and thereby converts and sends the data indicating the control command to the controlled device designated by the type, and
the third processor performs control to execute control command indicated by the converted data from the controlling device by executing the first control program received from the controlling device.

4. The control system as set forth in claim 1, wherein:
the second processor performs control to receive model information indicative of a type of a controlled device from a controlled device disposed within a wirelessly communicable distance,
the second processor performs control to send the transmission request for the collaboration information designated by the model information received from the controlled device to the sever apparatus, and
the third processor performs control to send model information indicative of a type of the controlled device to the controlling device, in response to a request from the controlling device.

5. The control system as set forth in claim 1, wherein:
the first processor and the second processor establish a connection for communication by way of a public network, and
the second processor and the third processor establish a connection for communication by way of a personal network.

6. The control system as set forth in claim 2, wherein:
the controlled device includes a display that displays an image, and
the third processor performs control to perform, as an extension function related to an image display, image processing and image display, selectively in response to the control command indicated by the converted data sent from the controlling device, based on the received collaboration information and the received command set.

7. The control system as set forth in claim 1, wherein:
each of the plurality of sets of collaboration information is stored in the memory for a respective one of a plurality of combinations of the controlled devices of different types, the controlling devices of different types, and application programs of different types,
the first processor performs control to (i) search for, in response to the transmission request for collaboration information designating the type of controlled device and the type of controlling device from the controlling device, a plurality of sets of collaboration information corresponding to the combination of the type of the controlled device having been designated and the type of the controlling device having been designated, from among the plurality of sets of collaboration information stored in the memory, (ii) send a list of a plurality of application programs respectively corresponding to the plurality of sets of collaboration information having been searched for, to the controlling device, and (iii) send collaboration information and a command set corresponding to an application program selected by the controlling device in response to sending of the list to the controlling device, and
the second processor performs control to receive the list of the plurality of application programs sent from the server apparatus, in response to the transmission request for the collaboration information which is to be displayed, sends selected information of an application program selected by a user from among the list to the server apparatus, and receives collaboration information and a command set sent from the server apparatus, in response to sending of the selected information.

8. The control system as set forth in claim 1, wherein the memory further stores image data, the collaboration information comprises authentication information that allows transmission of image data from the server apparatus, and the third processor performs control to acquire the image data from the server apparatus based on the authentication information received as the collaboration information.

9. The control system as set forth in claim 1, wherein the plurality of command sets include a command set comprising a set of control commands relating to functions of processing a still image.

10. A controlling device which operates in collaboration with an information terminal as a controlled device, the controlling device being a mobile terminal and comprising:
an operation interface that is configured by various keys and that accepts input of a key operation by a user; and
a processor which functions as:
a first communication control unit that controls communication with a server apparatus that stores, in a memory, (i) a plurality of sets of collaboration information each of which is usable to cause the controlled device and the controlling device to operate in collaboration with each other, each of the plurality of sets of collaboration information including conversion information for converting a key operation input at the operation interface into a command comprehensible by the controlled device, and (ii) a plurality of command sets each of which comprises a set of control commands, each of the plurality of command sets being common to all of the plurality of sets of collaboration information, wherein each of the plurality of sets of collaboration information is stored in the memory for a respective one of a plurality of combinations of controlled devices of different types and controlling devices of different types;
a second communication control unit that controls communication with the controlled devices of different types;
an acquisition control unit that sends, to the server apparatus, a transmission request for collaboration information designating a type of controlling device and a type of controlled device which is an object of control to be controlled for operating in collaboration with the controlling device itself, and acquires collaboration information and a command set sent from the server apparatus in response to the transmission request; and
a collaboration control unit that controls the controlled device by converting, using the conversion information included in the collaboration information acquired from the server apparatus, data of the input key operation accepted by the operation interface into data indicating a control command from among the control commands of the command set acquired from the server apparatus, and by sending the converted data indicating the control command to the controlled device which is the object of control for operating in collaboration with the controlling device itself based on the collaboration information and the command set acquired by the acquisition control unit.

11. The controlling device as set forth in claim 10, wherein the collaboration control unit sends the collaboration information and the command set acquired by the acquisition control unit to the controlled device, and sends the converted data indicating the control command to the controlled device which processes the control command indicated by the converted data based on the collaboration information and the command set sent thereto.

12. The controlling device as set forth in claim 11, wherein the collaboration information includes:
a first control program that causes the controlled device to operate in the collaboration; and
a second control program that causes the controlling device to operate in the collaboration,
wherein the collaboration control unit sends the first control program included in the collaboration information to the controlled device to have the controlled device execute the first control program, and executes the second control program by itself.

13. The controlling device as set forth in claim 10, wherein the second communication control unit receives model information indicative of a type of controlled device disposed within a wirelessly communicable distance, and the acquisition control unit requests that the server apparatus send the collaboration information by designating the model information received by the second communication control unit.

14. The controlling device as set forth in claim 10, wherein the acquisition control unit requests that the server apparatus send the collaboration information designated by the type of the controlling device itself and the type of the controlled device to be operated in collaboration with the controlling device itself, and receives the collaboration information sent from the server apparatus in response to the request.

15. The controlling device as set forth in claim 10, wherein the acquisition control unit (i) sends the transmission request to the server apparatus requesting transmission of the collaboration information designating the type of the controlling device and the type of the controlled device to be operated in collaboration with the controlling device itself, (ii) receives a list of a plurality of application programs sent from the server apparatus in response to the transmission request so as to display the list, (iii) sends selection information of an application program selected by a user from the displayed list to the server apparatus, and (iv) receives collaboration information and a command set sent from the server apparatus in response to the transmission of the selection information.

16. A control method of a control system comprising an information terminal as a controlled device, a mobile terminal as a controlling device, and a server apparatus, wherein the controlled device, the controlling device, and the server apparatus are communicatively connected to one another, and wherein the method comprises:
  a step of sending a transmission request from the controlling device to the server apparatus requesting transmission of collaboration information designating a type of the controlled device and a type of the controlling device;
  a step, performed by the server apparatus in response to receiving the transmission request, of selecting collaboration information and a command set corresponding to a combination of the type of the controlled device having been designated and the type of the controlling device having been designated from among a plurality of sets of collaboration information and a plurality of command sets stored in the server apparatus, each of the plurality of sets of collaboration information being usable to cause a controlled device and a controlling device to operate in collaboration with each other, each of the plurality of sets of collaboration information including conversion information for converting a key operation input at a controlling device into a command comprehensible by a controlled device, each of the plurality of command sets comprising a set of control commands and being common to all of the plurality of sets of collaboration information, and each of the plurality of sets of collaboration information being stored for a respective one of a plurality of combinations of controlled devices of different types and controlling devices of different types;
  a step, performed by the server apparatus, of sending the collaboration information and the command set having been selected to the controlling device;
  a step, performed by the controlling device, of receiving the collaboration information and the command set sent from the server apparatus in response to the transmission request;
  a step, performed by the controlling device, of accepting input of a key operation by a user at an operation interface of the controlling device, the operation interface being configured by various keys;
  a step, performed by the controlling device, of converting, using the conversion information included in the collaboration information having been received from the server apparatus, data of the accepted input key operation input at the operation interface into data indicating a control command from among the control commands of the command set having been received from the server apparatus;
  a step, performed by the controlling device, of sending the converted data indicating the control command to the controlled device designated by the type; and
  a step, performed by the controlled device, of operating in accordance with a new function by processing to receive and execute the control command indicated by the converted data sent from the controlling device based on the received collaboration information and the received command set.

17. The control method as set forth in claim 16, further comprising:
  a step of sending a program included in a portion of the collaboration information received by the controlling device to the controlled device,
  wherein the controlled device receives the program included in the portion of the collaboration information from the controlling device and processes and executes the control command indicated by the converted data sent from the controlling device by executing the program having been received.

18. The control system as set forth in claim 9, wherein the plurality of command sets further include a command set comprising a set of control commands relating to functions of processing a moving image.

* * * * *